United States Patent [19]
MacCready, Jr.

[11] Patent Number: 6,086,015
[45] Date of Patent: Jul. 11, 2000

[54] AERIAL TRANSPORT METHOD AND APPARATUS

[75] Inventor: Paul B. MacCready, Jr., Pasadena, Calif.

[73] Assignee: Aerovironment, Inc., Monrovia, Calif.

[21] Appl. No.: 09/307,016

[22] Filed: May 7, 1999

[51] Int. Cl.⁷ .................................................. B64C 29/00
[52] U.S. Cl. ...................... 244/7 B; 244/45 R; 244/137.1
[58] Field of Search ............................... 244/6, 7 R, 7 B, 244/7 C, 137.1, 2, 3, 45 R, 23 R

[56] References Cited

U.S. PATENT DOCUMENTS

| | | | |
|---|---|---|---|
| 1,655,114 | 1/1928 | Tesla | 244/7 B |
| 2,794,609 | 6/1957 | Perry | 244/7 B |
| 2,901,251 | 8/1959 | Pettit . | |
| 3,113,747 | 12/1963 | Smith | 244/3 |
| 3,211,429 | 10/1965 | Steward . | |
| 3,567,156 | 3/1971 | Bauer | 244/2 |
| 3,888,435 | 6/1975 | Foote . | |
| 3,985,317 | 10/1976 | Geraci et al. | 244/45 R |
| 4,124,181 | 11/1978 | Kolwey . | |
| 4,234,073 | 11/1980 | Satterwhite . | |
| 4,640,474 | 2/1987 | Manseth . | |
| 4,695,012 | 9/1987 | Lindenbaum | 244/2 |
| 4,757,959 | 7/1988 | Schroder et al. | 244/2 |
| 5,765,783 | 6/1998 | Albion | 244/7 B |
| 5,826,825 | 10/1998 | Gabriel | 244/137.1 |
| 5,842,667 | 12/1998 | Jonnes | 244/23 R |

*Primary Examiner*—Galen L. Barefoot
*Attorney, Agent, or Firm*—William W. Haefliger

[57] ABSTRACT

Apparatus for transporting a load between source and destination locations, comprising an aircraft having a body, power plant carried by the body to drive the aircraft both generally vertically and also generally horizontally, the aircraft also having a wing structure that has a leading edge remaining presented in the direction of flight; and load pick-up, carry and set-down means connected to the aircraft to elevate the load from the source location, transport the elevated and air-borne load generally horizontally, and set the load down at the destination location, the body and power plant configured for vertical flight mode to elevate and set down the load, and for generally horizontal flight mode to transport the elevated load generally horizontally below the level of the aircraft body.

24 Claims, 8 Drawing Sheets

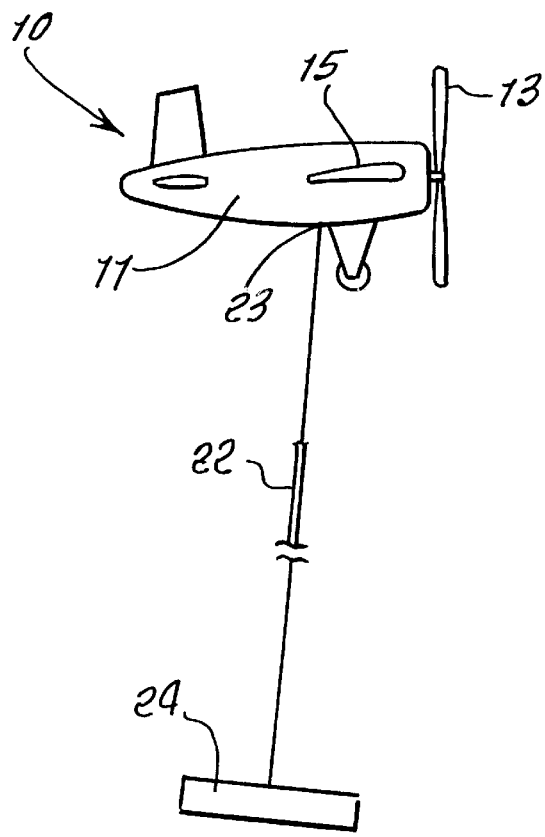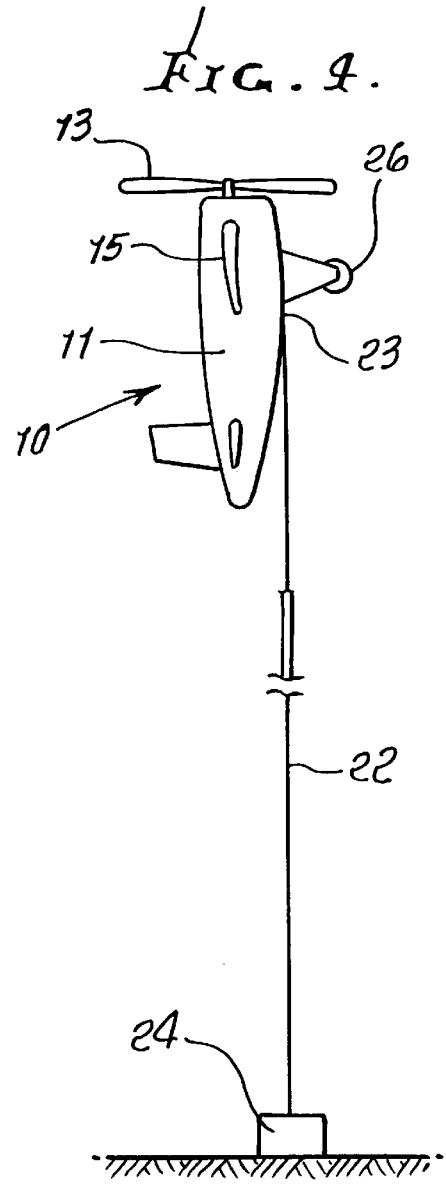

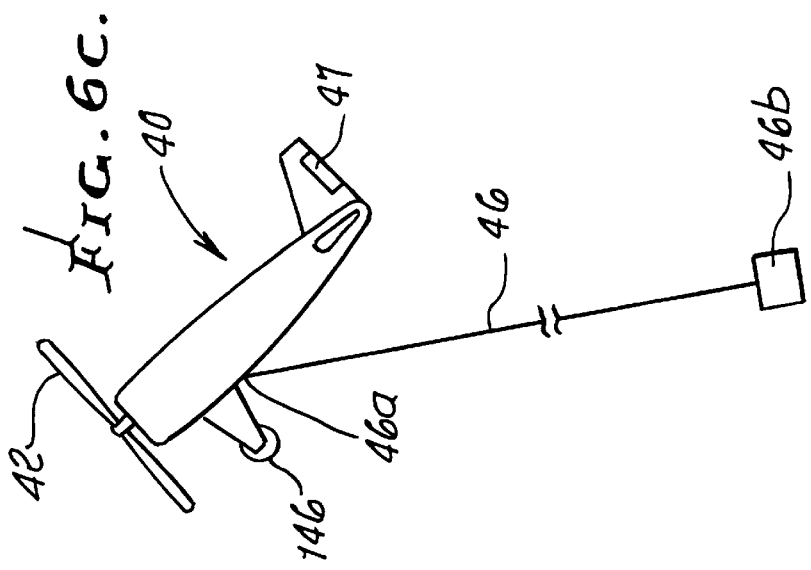
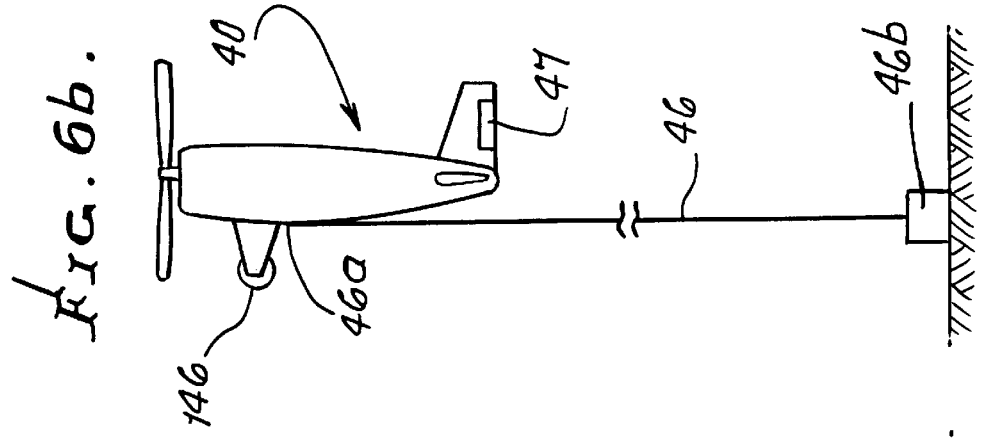
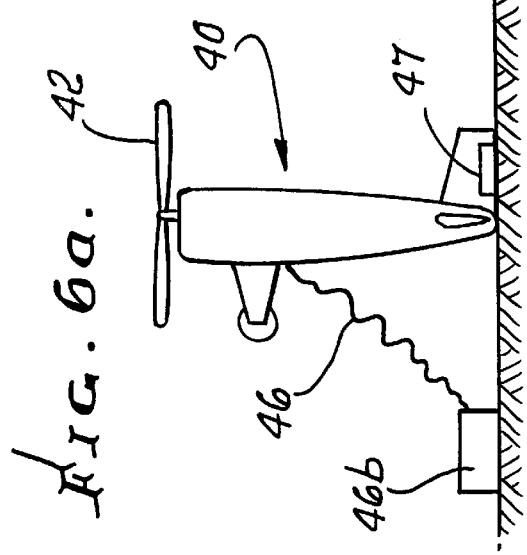

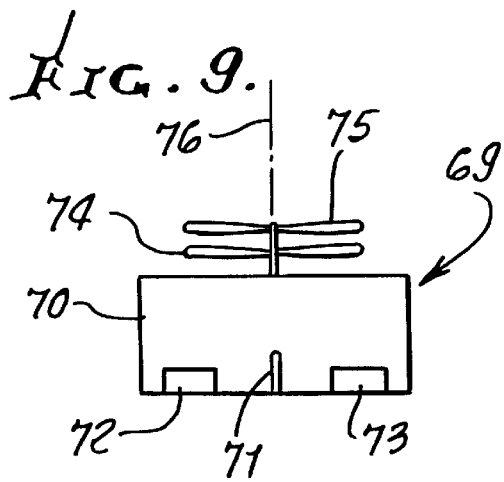
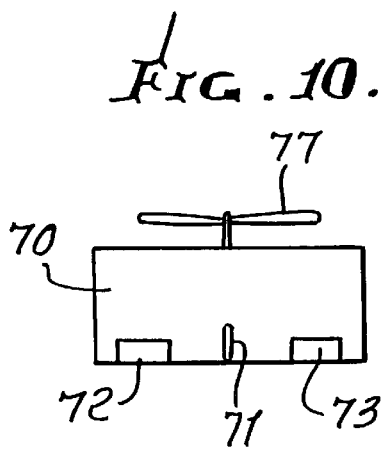
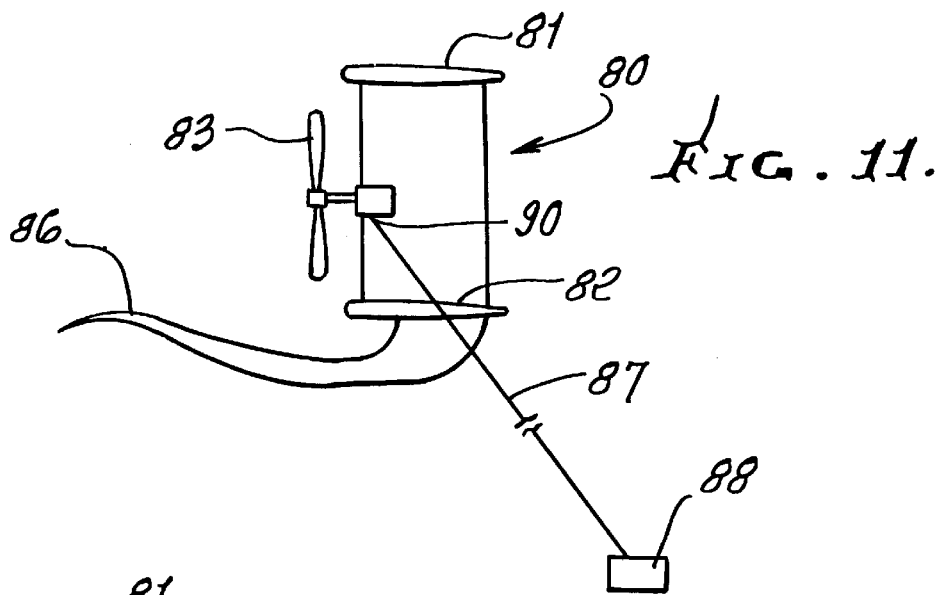
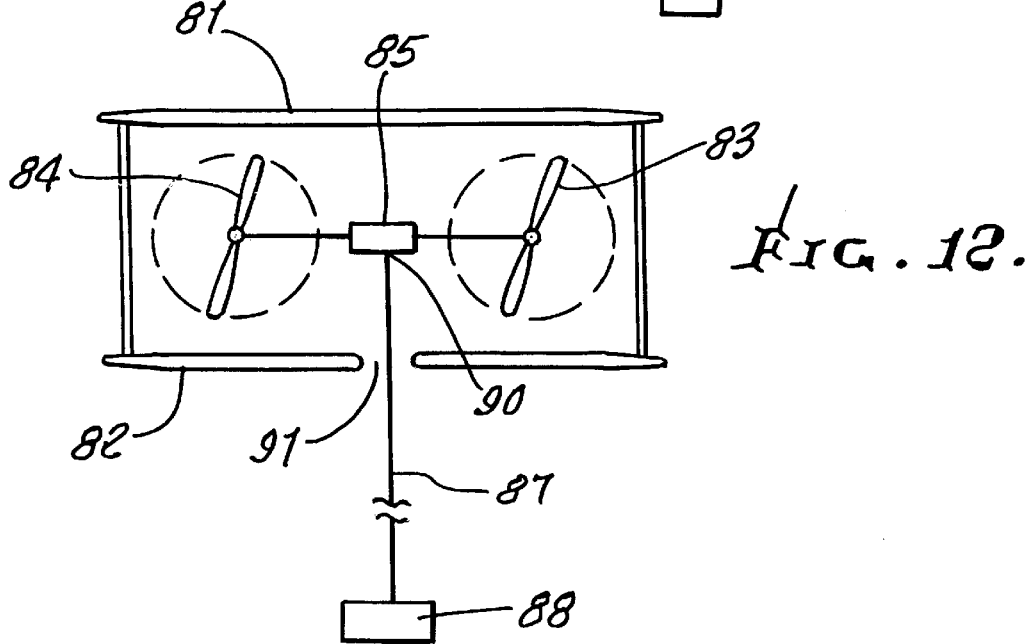

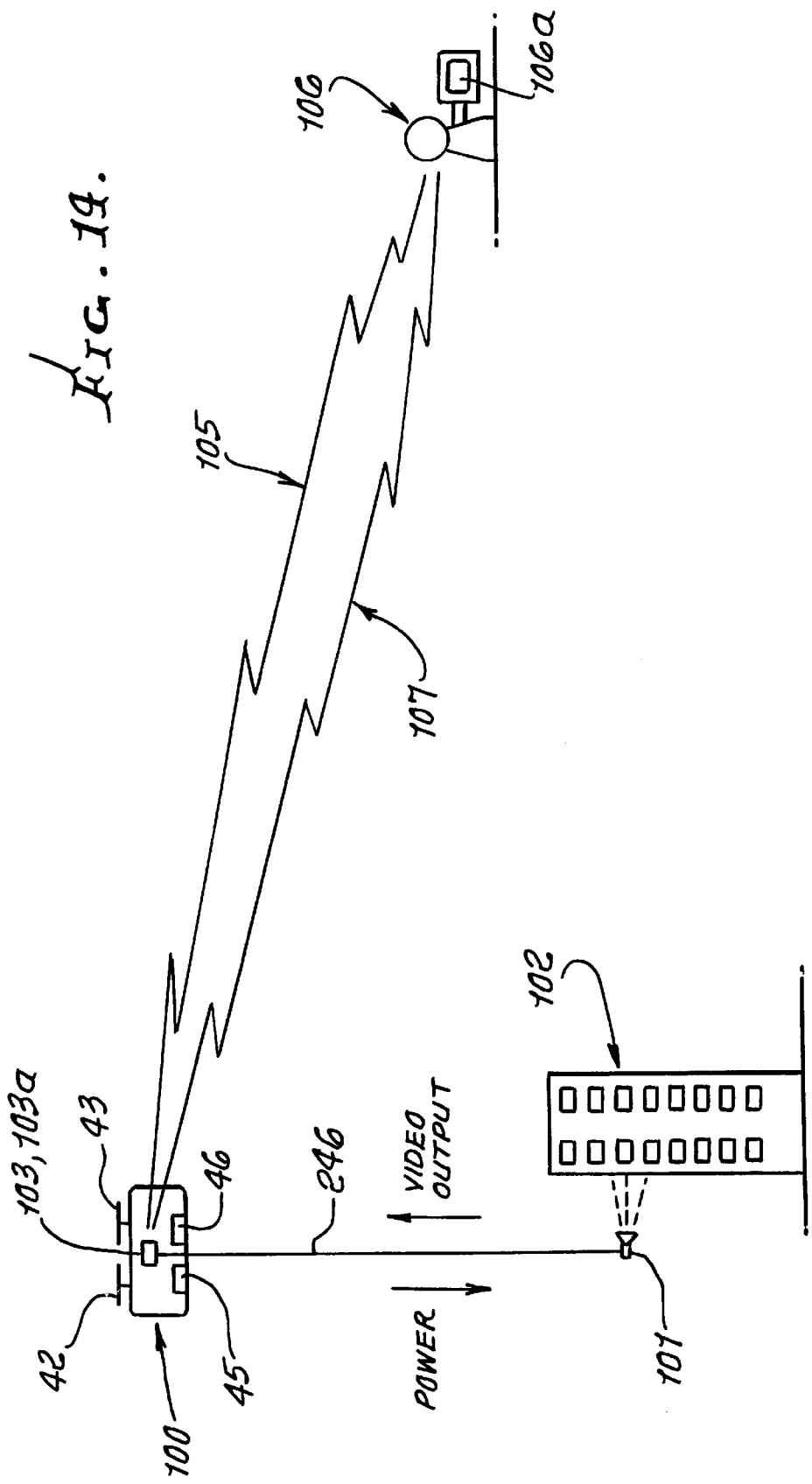

AERIAL TRANSPORT METHOD AND APPARATUS

BACKGROUND OF THE INVENTION

This invention relates generally to load transportation apparatus and method; and more particularly concerns improvements in such transportation apparatus wherein an aircraft is employed to pick up the load at a source location, to be suspended below the aircraft, to transport the suspended load, and to safely set the load down at a destination location. The apparatus is configured to repeatedly perform such load pick-up transportation and set-down, in a rapid, efficient and cost effective manner.

There is great commercial need for equipment capable of the above referenced load transportation mode or modes. For example, load transport to and from locations lacking aircraft landing strips is clearly needed. There is also need for means to permit the load to be suspended below the aircraft vehicle so as to permit the load to have any size or shape without increasing the size of the aircraft, and without encountering difficulties associated with inserting the load into fuselage, reversing it, and while maintaining the vehicle center of gravity position.

Further, loads must be sized for inserting into fuselages whereby there is need to avoid these time and size limitations.

SUMMARY OF THE INVENTION

It is a major object of the invention to provide aircraft equipment capable of rapidly and efficiently picking up a load for suspension beneath the aircraft, transporting the suspended load to a destination, and safely setting the load down at that destination. Basically, the equipment comprises, in combination a) an aircraft having a body, power plant carried by the body to drive the aircraft both generally vertically and also generally horizontally, the aircraft also having a wing structure that may also serve as the body structure, that has a leading edge remaining presented in the direction of forward flight, b) and load pick-up, carry and set down means connected to the aircraft and elongated below the body to elevate the load from the source location, transport the elevated and air-borne load generally horizontally, and set the load down at the destination location while the aircraft is air-borne, c) the body and power plant configured for vertical flight mode to elevate and set down the load, and for generally horizontal flight mode to transport the elevated load generally horizontally below the level of the aircraft body, the bulk of the lift transmitted to the aircraft and load being supplied by the wing structure in rapid horizontal flight mode.

It is another object to provide such equipment wherein the aircraft power plant displaces gases in a stream or streams directed relatively rearwardly, and wherein some flight control surfaces are provided in the path of that stream. Such surfaces typically include roll, pitch and yaw surfaces for receiving force transmission from the gas stream or streams. Accordingly, highly accurate load pick-up and set down is achievable, as a result of accurate aircraft maneuverability, in a generally vertical flight mode.

Yet another object is to provide aircraft fixed wing structure that projects out of the path of said stream. That wing structure typically includes two generally oppositely directed wings, each wing having an inner section in the path of the gas stream, and another section such as an outer section projecting out of the path of said stream. Such inner and outer sections may advantageously define a shallow V-shape, for enhanced aircraft stability in horizontal flight. Also, swiveling of the power plant relative to the fuselage is not required to achieve forward flight as distinguished from vertical flight, during load pickup. The power plant may comprise either of the following:

i) an engine driving a propeller, ii) a jet engine producing a rearwardly directed jet stream.

An additional object is to provide landing gear projecting generally rearwardly relative to the aircraft body and power plant, whereby the gas stream is directed generally downwardly when the landing gear supports the aircraft in landing mode.

A further object is to provide a load pickup, carry and set-down line connection to the aircraft such that the line or tether is operatively connected to the aircraft to extend generally horizontally away from the aircraft when the aircraft is landed. In this regard, the line may advantageously be suspended generally vertically below the center of gravity of the aircraft in aircraft flight mode.

Yet another object is to provide a power plant that comprises two counter-rotating propellers offset laterally. In this regard, the body and wing structures may be integrated to define a generally rectangular configuration as viewed in a direction perpendicular to said wing structure. An added object is to provide two coaxially and counter-rotating propellers, in front of a rectangular body and wing.

A further object includes providing a fleet of such aircraft traveling in a defined air transportation corridor, and each said multiple aircrafts carrying a load suspended beneath the flight level of the aircraft by said elongated load pick-up, carry and set down means. Control means may be provided for controlling the traveling of said aircraft and operation of said load pick-up and set down means at said source and destination locations, respectively. The aircraft may be controlled to fly at controlled elevations less than about 1000 feet over terrain below the aircraft.

A yet further object is to provide methods of operating such an aircraft, and fleets of such aircraft in load pick-up, travel and set down at different source and destination locations, as will be seen.

These and other objects and advantages of the invention, as well as the details of an illustrative embodiment, will be more fully understood from the following specification and drawings, in which:

DRAWING DESCRIPTION

FIG. 3 is an elevation showing the FIG. 1 aircraft in horizontal flight mode, and transporting a load;

FIG. 4 is a view like FIG. 1 showing the aircraft in load set-down mode the aircraft shown suspended below the propeller, as it lowers in hover condition;

FIGS. 6a–6e show the FIG. 5 aircraft in various horizontal flight modes, transporting the load, and in landing modes;

FIGS. 7–12 are elevations showing modified load transporting aircraft;

FIG. 14 is a schematic view of an aircraft as described, used for remote observation of targets.

DETAILED DESCRIPTION

Figure 1:
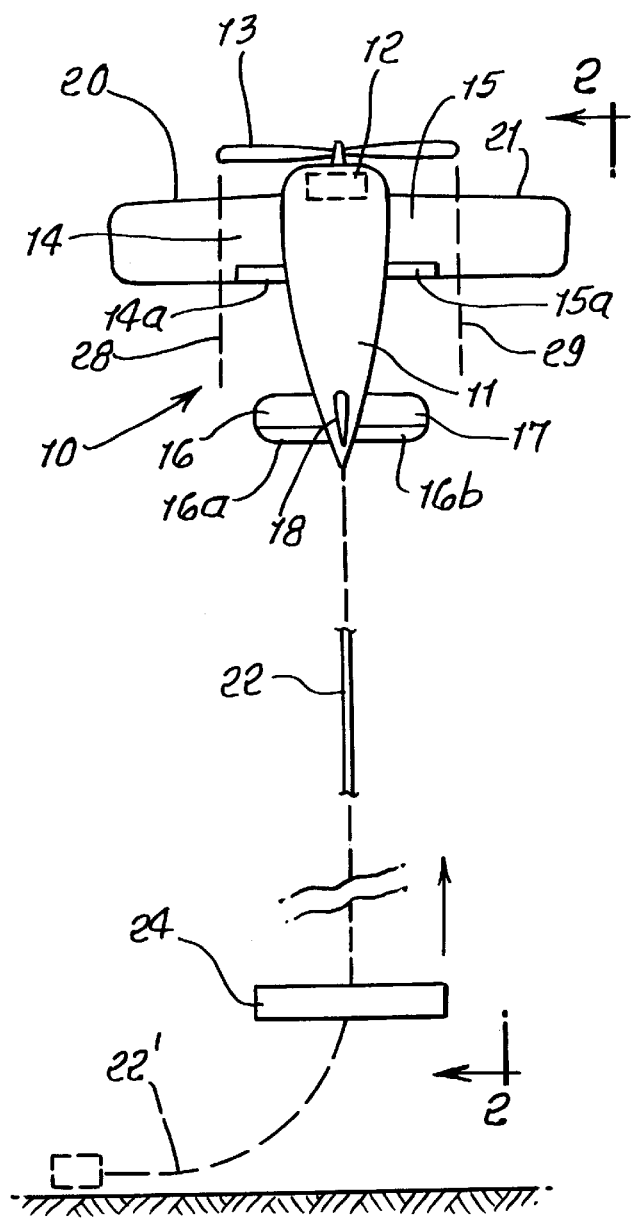
FIG. 1 is an elevation showing the form of load transporting aircraft, in load pick-up mode of flight.
Figure 2:
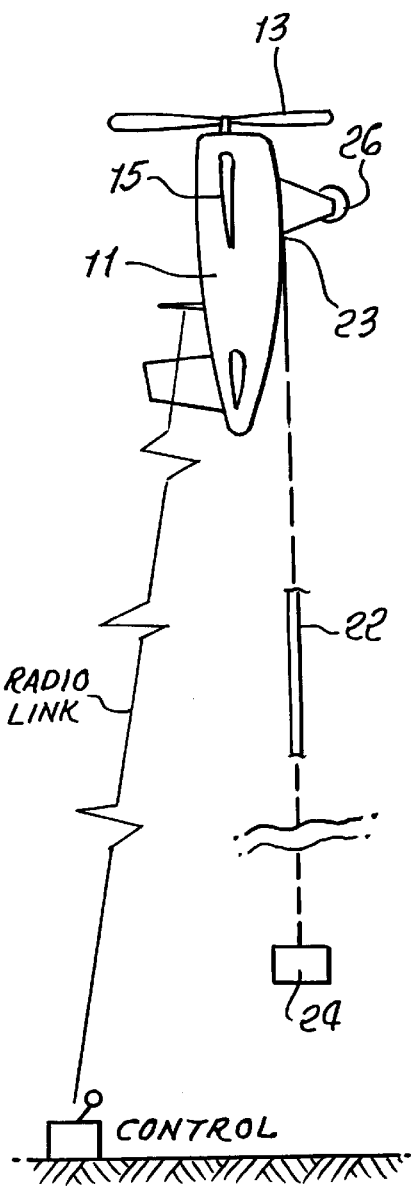
FIG. 2 is an elevation taken on lines 2—2 of FIG. 1.

In FIGS. 1 and 2 an apparatus for transporting a load through the air between source and destination locations is shown. It includes an aircraft 10 having a body or fuselage 11, and a power plant 12 carried by the body to rotate propeller 13 (or propellers) to drive the aircraft both suspended generally vertically as shown in FIGS. 1, 2 and 4, and also traveling generally horizontally as shown in FIG. 3. It will be understood that the aircraft transitions between vertical and horizontal modes of flight as shown. The aircraft power plant also includes a propeller 13 as shown which produces air flow rearwardly over wing surfaces 14 and 15; control surfaces such as ailerons 14a and 15a and tail surfaces 16 and 17 with elevators 16a and 16b; and a rudder 18. Such control surfaces control the flight pattern of the aircraft. The wing structure has leading edges 20 and 21 which remain presented in the direction of upward flight, and horizontal flight, as shown in FIG. 1, 2 and 3. During downward vertical flight, edges 20 and 21 are upwardly presented as seen in FIG. 4, the aircraft hovering and lowering as the load is set down.

Also provided is load pick-up, carry and set down means connected to the aircraft and elongated below the body to elevate the load from the source location; to transport the elevated air-borne load generally horizontally; and to set the load down at the destination location while the aircraft is air-borne. See for example the cable 22 attached to the aircraft body, as for example at 23 proximate the center of gravity of the aircraft. Location 23 is typically at the underside of the fuselage. The cable extends downwardly toward the ground or other surface for connection to a load represented at 24 to be picked up, transported, and set down. Typically load pick-up and set down are accomplished during vertical hover of the aircraft as seen in FIGS. 1, 2 and 4, the aircraft rising to pick-up the load, and lowering to set down the load, no swiveling of the power plant being required, for simplicity.

The aircraft body and power plant are configured for vertical flight mode to elevate and set down the load, at said source and destination locations, and for generally horizontal flight mode to transport the elevated load generally horizontally below the level of the aircraft body, the bulk of the lift transmitted to the aircraft and load being supplied by the wing structure in horizontal flight mode, at cruise speed.

The cable 22 will be seen to extend generally horizontally away from directly under the aircraft, as represented at 22' in FIG. 1 to allow take off and landing of the aircraft as on landing gear 26. The load can be connected to the cable and disconnected from the cable, during hover mode of the aircraft. Other landing modes are contemplated. During aircraft flight mode, the line 22 is suspended generally vertically below the center of gravity of the aircraft.

It will be further seen in FIGS. 1 and 2 that the power plant directs or displaces gases such as air rearwardly over the flight control surfaces as referred to, to control roll, pitch and yaw. Outer portions of the wing structure tip project out of the paths of such air streams, such paths indicated at 28 and 29 in FIG. 1. Inner and outer sections of each wing may define a shallow V-shape therebetween. The power plant may comprise an engine driving a propeller, or a jet engine producing a rearwardly directed jet stream.

Figure 5:
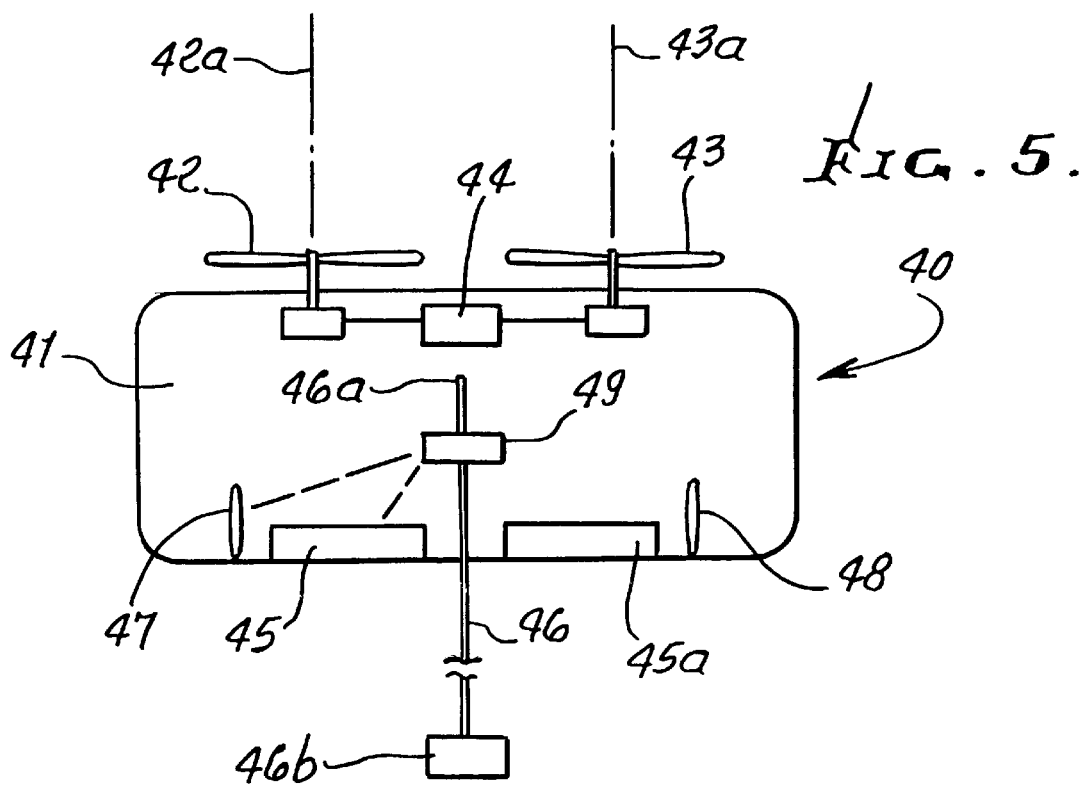
FIG. 5 is a view like FIG. 1 but showing a simpler form of aircraft, lifting or lowering a load, the aircraft having two counter-rotating propellers with spaced apart axes.
Figure 5A:
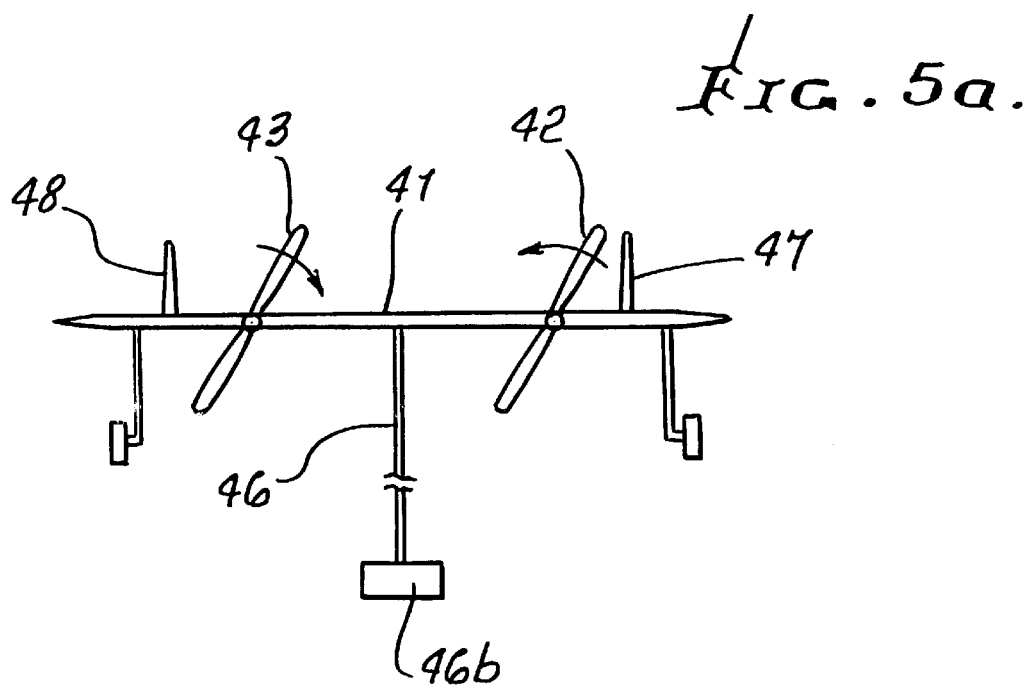
FIG. 5a is a frontal view of that aircraft.
Figure 6D:
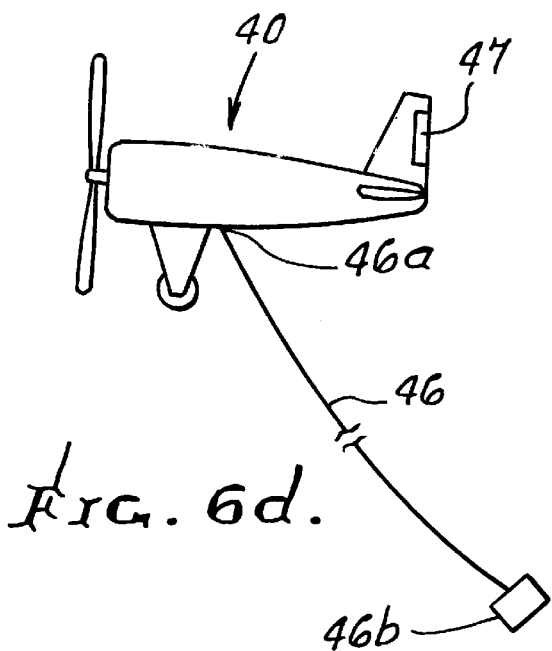
Figure 6E:
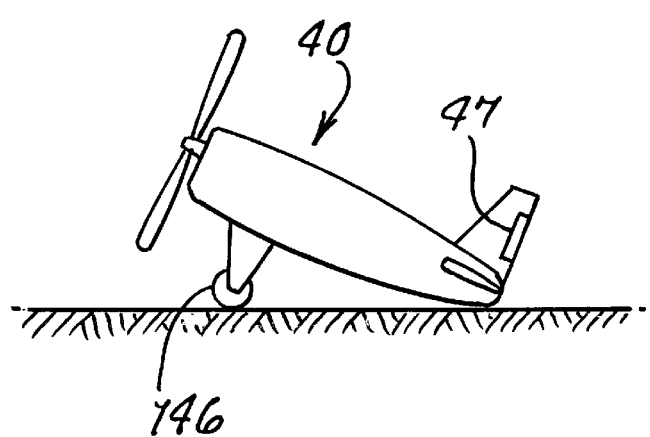

In FIGS. 5 and 5a, the body and wing structures of the modified and preferred aircraft 40 are integrated to define a generally rectangular or trapezoidal configuration as viewed at 41 in a direction perpendicular to the wing structure. Two counter-rotating propellers are indicated at 42 and 43, as driven by a power plant 44, or separate power plants, to direct air streams rearwardly over control surfaces, such as elevators 45 and 45a and fins 47 and 48 to control roll, pitch and yaw. A control for such surfaces is seen at 49. Jet engines may be substituted. As shown in FIG. 5 the aircraft is upright in hover mode (as during load pick-up or set down) with the propeller axes 42a and 43a directed generally vertically, the body suspended to "hang" generally vertically therebelow. The load line 46 is connected to the body at 46a at or near the center of gravity of the aircraft, the load seen at 46b. FIG. 6a shows the aircraft in vertical landed mode. FIG. 6b shows the aircraft in vertical ascent; FIG. 6d shows a transitioned inclined mode; and in FIG. 6d the aircraft is flying forwardly, as during cruise conditions. FIG. 6e shows the aircraft in a landed mode, on wheels 146 and tail. The body in section may generally have airfoil shape as shown.

Figure 7:
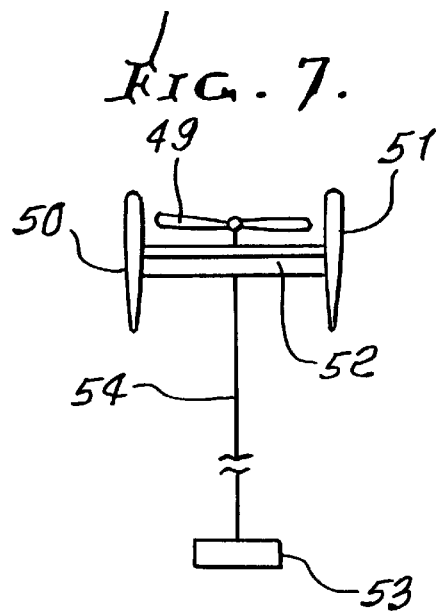
Figure 8:
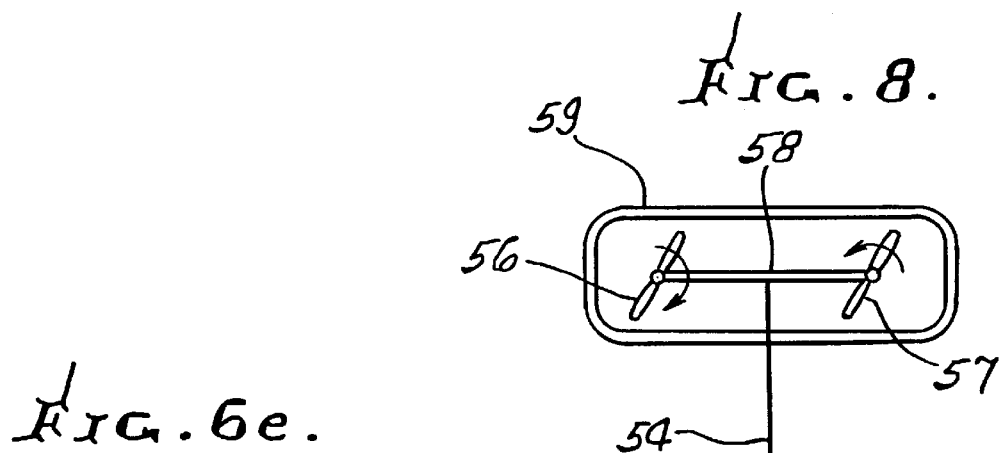

FIG. 7 shows a modified aircraft having a propeller 49 between vertically oriented and spaced apart fins 50 and 51, in hover mode. Aircraft frame structure appears at 52 and may have airfoil shape in cross-section. A load is shown at 53 suspended by line 54 from the center of gravity of the aircraft. FIG. 8 is like FIG. 7 but shows two counter-rotating propellers 56 and 57 connected to body structure 58 and surrounded by a duct 59 as shown.

FIG. 9 shows a modified aircraft 69 with a generally rectangular aircraft body 70 having contral surfaces 71–73, and two counter-rotating propellers 74 and 75. The latter have a common axis 76 of rotation. FIG. 10 is like FIG. 9 but a single propeller 77 spans the lateral overall spacing defined by the contral surfaces 71–73.

FIGS. 11 and 12 are side and front views of a modified aircraft 80 having interconnected upper and lower wings 81 and 82, generally like wing 41. Two counter-rotating propellers 83 and 84 are located between planes defined by the wings, and are laterally separated, as shown. A power plant is seen at 85 to drive the propellers. A stabilizing forward canard is seen at 86, and is connected to the lower wing. A line 87 carrying a load 88, is connected to the aircraft at its center of gravity 90 above the lower wing. That wing may be slotted or bifurcated into left and right sections, to pass the line at 91.

Figure 13:
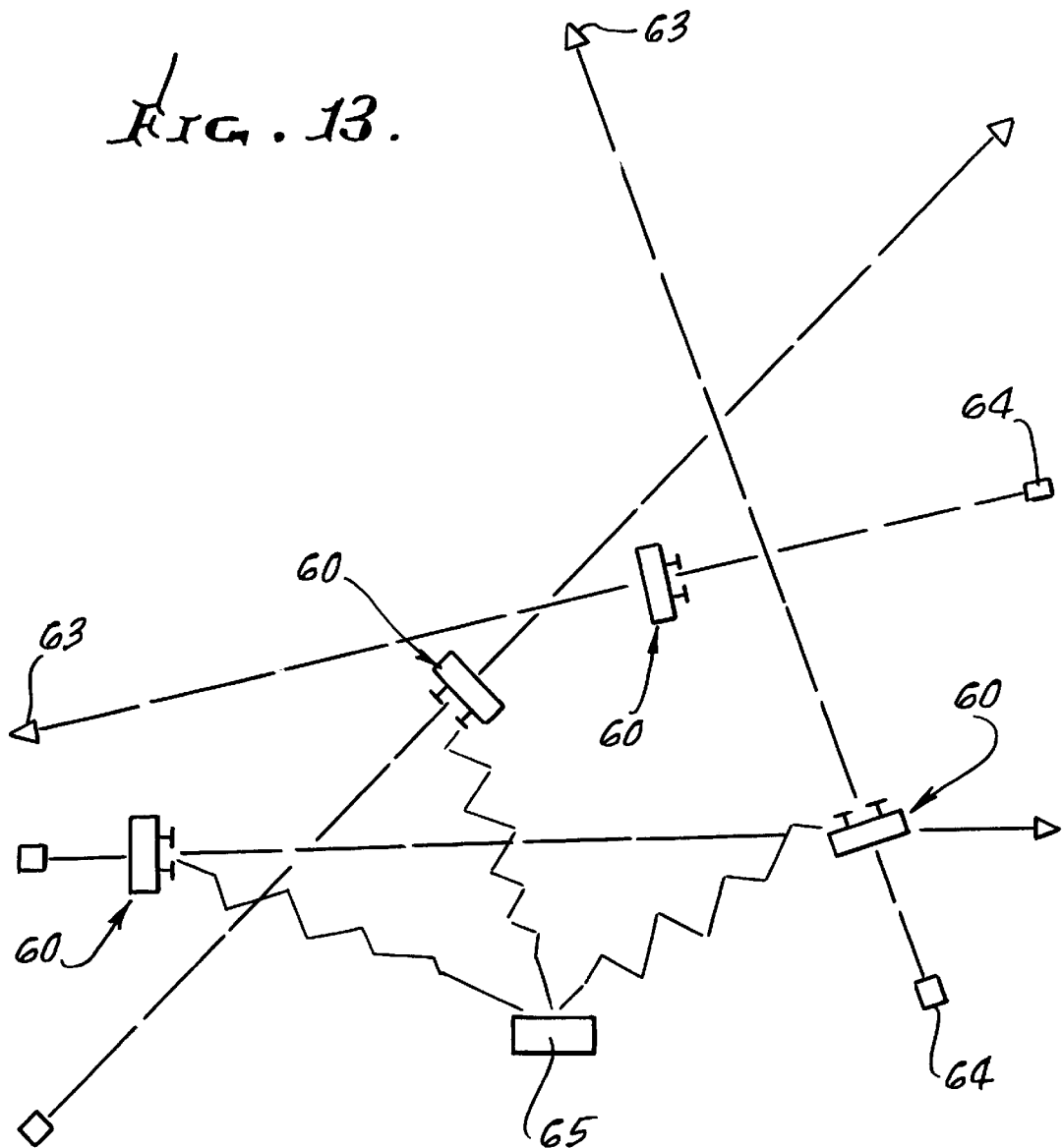
FIG. 13 is a plan view showing a fleet of aircraft of FIGS. 5 and 6 type transporting loads along prescribed flight paths, at low elevations.

FIG. 13 shows multiple aircraft 60 of the type seen in FIG. 5 and flying in different directions, and in corridors, as indicated, between different source and destination locations 63 and 64. If desired, the aircraft control surfaces can be radio controlled via a transmitter 65 of different control frequencies to the different aircraft as shown. Typically the load transporting aircraft will fly at low elevations such as below 1000 feet above ground and which are selected or controlled. Such aircraft may be of a relatively small size, as for delivering packages, mail or other articles safely and rapidly between selected locations.

FIG. 14 shows an aircraft 100 like that of FIG. 5, hovering above a site to be observed. A load line 246, like line 46 in FIG. 5, suspends an observation device 101 such as a video camera. The latter has a representative target such as a building 102 or part of a building such as a window, within its field of view. Data from the device 101 is transmitted to the aircraft, by a wire associated with line 246.

A transmitter 103 at the aircraft transmits the data by radio link 105 to a control center 106 at a distance from the aircraft provided with a video screen 106a for observation of the target. The horizontal and vertical positions of the aircraft and of the video camera are controlled from the center 106, as by radio or radio frequency link 107, transmitting to a receiver 103a at the aircraft. That receiver controls the aircraft, as via its control surfaces, and propulsion, to elevate or lower the aircraft, and the video camera 101, and move it horizontally. Circling of the aircraft, during hovering, is not required, or desirable.

The method of transporting a load between source and destination locations includes the steps a) providing an aircraft having a body, power plant carried by the body to drive the aircraft both generally vertically and also generally horizontally, the aircraft also having a wing structure that has a leading edge remaining presented in the direction of flight, b) providing load pick-up, carry and set down means connected to the aircraft and elongated below said body to elevate the load from the source location; to transport the elevated air-borne load generally horizontally; and to set the load down at the destination location while the aircraft is air-borne, c) the body and power plant configured for vertical flight mode to elevate and set down the load, at said source and destination locations, and for generally horizontal flight mode to transport the elevated load generally horizontally below the level of the aircraft body, the bulk of the lift transmitted to the aircraft and load being supplied by the wing structure in horizontal flight mode, at cruise speed, d) and operating the aircraft to pick up and suspend a load using the pick-up means, with the aircraft oriented generally vertically, to travel in a defined corridor thereby to transport the load, and to set the load down onto a support surface below the aircraft.

Technical features may typically include one or more of the following:

(a) Lightweight (gross weight well under 1000 lbs.), large wing span (say 42 feet) and area (say 240 ft$^2$) permit a modest size motor (say 75 HP maximum) to let the vehicle take off at slow speed and climb at a steep angle, and to operate at very low power (say 20 HP) in the "silent" intermediate flight range of 30–50 mph.

(b) The propeller(s) being ahead of the wing, and the wing having large flaps, the slipstream can be oriented downward fairly steeply and help achieve very low speed flight (especially when another or several flow directors in the slipstream are positioned appropriately with the flaps).

(c) The elevation angle of the body changes little with flight speed because the speed changes come from operation of large flaps.

(d) The GAFs let the flaps remain exterior (simplicity, lightness) at high speed but have virtually no aerodynamic effect on the operation of the small chord structural wing except for increasing parasite drag. Thus gust loads at high speeds are minimized. In the intermediate speed region, deriving some lift from the GAFs means gust loads and the effects of turbulence on vehicle operation are lessened. (Note that the tabs at the trailing edge that control or orient the flaps provide a reflex airfoil shape in the high $C_L$ mode, that decreases pitch stability problems as flaps move the center of lift back. A large stabilizer may be used to cover all pitch conditions.)

(e) A small, noisy two-cycle engine can be provided in a mechanism or location as at 80 in FIG. 6 where it can be used for propulsion should the primary engine stop. At 20 HP, even with a small prop, this emergency engine could take the SSA to a safe landing. In any case, it should be noted that the low landing speed of SSA renders emergency landings survivable under most circumstances.

(f) Propeller(s) ahead of the inner wing, with slipstream keeping all control surfaces active at all times (the vehicle is always under power, although an emergency glide is deemed feasible), and also aiding in wing lift.

(g) Varying payloads hung from the CG.

(h) Short fore-aft dimension, convenient for ground handling, essential for zero ground speed landing and takeoff over a range of winds from zero to strong.

(i) Outer wings for efficient lift at high speeds. Wings either rigid or orienting to the local flow by virtue of GAF or standard floating stable airfoils (that orient to a specific $C_L$ regardless of the direction of the oncoming air).

I claim:

1. Apparatus for transporting a load through the air between source and destination locations, comprising a) an aircraft having a body, power plant carried by the body to drive the aircraft both generally vertically and also generally horizontally, and transition therebetween, the aircraft body also having a wing structure that has a leading edge remaining presented in the direction of flight, said power plant displacing gases in a stream directed relatively rearwardly of the power plant, and including flight control surfaces in the path of said stream, said wing structure including two generally oppositely directed and protruding wings that remain stationary relative to the body, each wing having an inner section projecting in the path of said stream and an outer section projecting out of the path of said stream, the outer sections spaced apart by a length greater than the body width proximate the wings, b) and load pick-up, carry and set down means including a line connected to the aircraft proximate the aircraft center of gravity and elongated below said body to elevate the load from the source location with the line extending substantially vertically proximate the underside of the body, to transport the elevated air-borne load generally horizontally; and to set the load down at the destination location while the aircraft is air-borne, c) said body and power plant configured for vertical flight mode to elevate and set down the load, at said source and destination locations, and for generally horizontal flight mode to transport the elevated load generally horizontally below the level of the aircraft body, whereby substantially all of the lift transmitted to the aircraft and load is supplied by the wing structure in horizontal flight mode, at cruise speed, and all loading exerted by said load is transmitted to the bod proximate the aircraft center of gravity during both vertical and horizontal flight of the aircraft, the body elongated vertically during vertical flight, and elongated horizontally during horizontal flight, d) said line extending alongside the body along the body length during vertical flight, and the line extending below a mid-portion of the body during horizontal flight.

2. The combination of claim 1 wherein said flight control surfaces include roll, pitch and yaw control surfaces.

3. The combination of claim 1 wherein said wing structure projects out of the path of said stream.

4. The combination of claim 1 wherein said inner and outer sections of each wing define a shallow V-shape.

5. The combination of claim 1 wherein said power plant comprises one of the following:
   i) an engine driving a propeller,
   ii) a jet engine producing a rearwardly directed jet stream.

6. The combination of claim 1 including landing gear projecting generally rearwardly relative to said body and power plant, whereby said stream is directed generally downwardly when said landing gear supports the aircraft in landed mode.

7. The combination of claim 1 wherein said direction of flight is longitudinal, and said power plant comprises two counter-rotating propellers offset laterally.

8. The combination of claim 1 wherein said body and wing structures are integrated to define a generally rectangular configuration as viewed in a direction perpendicular to said wing structure.

9. The combination of claim 7 wherein said body and wing structures are integrated to define a generally rectangular configuration as viewed in a direction perpendicular to said wing structure.

10. A fleet of multiple aircrafts as defined in claim 1 and traveling in a defined air transportation corridor, and each said multiple aircrafts carrying a load suspended beneath the flight level of the aircraft by said elongated load pick-up, carry and set down means.

11. The fleet of aircraft as defined in claim 10 including control means for controlling the traveling of said aircraft and operation of said load pick-up and set down means at said source and destination locations, respectively.

12. The fleet of aircraft of claim 11 wherein said aircraft are at controlled elevations less than 1000 feet, above terrain below the aircraft.

13. The method of transporting multiple loads between different source and destination locations, that includes
   a) providing multiple aircraft, each having a body, power plant carried by the body to drive the aircraft both generally vertically and also generally horizontally, each aircraft also having a wing structure that has a leading edge remaining presented in the direction of flight, said power plant displacing gases in a stream directed relatively rearwardly of the power plant, and including flight control surfaces in the path of said stream, said wing structure including two generally oppositely directed and protruding wings that remain stationary relative to the body, each wing having an inner section projecting in the path of said stream and an outer section projecting out of the path of said stream, the outer sections spaced apart by a length greater than the body width proximate the wings,
   b) providing for each aircraft a load pickup, carry and set down means including a line connected to and elongated below said body to elevate the load from the source location; to transport the elevated air-borne load generally horizontally; and to set the load down at the destination location while the aircraft is air-borne,
   c) the body and power plant of each aircraft configured for vertical flight mode to elevate and get down the load, at said source and destination locations, and for generally horizontal flight mode to transport the elevated load generally horizontally below the level of the aircraft body, the bulk of the lift transmitted to the aircraft and load being supplied by the wing structure in horizontal flight mode, and all loading exerted by said load ig transmitted to the body proximate the aircraft center of gravity during both vertical and horizontal flight of the aircraft, the body elongated vertically during vertical flight, and elongated horizontally during horizontal flight, said line extending alongside the body along the body length during vertical flight, and the line extending below a mid-portion of the body during horizontal flight,
   d) and operating each said multiple aircraft to pick-up and suspend a load using said pick up means, to travel in a defined corridor thereby to transport the load, and to set the load down onto a support surface below the aircraft.

14. The method of claim 13 including controlling the traveling of said multiple aircraft to fly at elevations below 1000 feet above the ground terrain, and to effect operation of the load pick-up and set down means of said aircraft at different source and destination locations, respectively.

15. The method of transporting a load between source and destination locations, that includes the steps:
   a) providing an aircraft having a body, power plant carried by the body to drive the aircraft both generally vertically and also generally horizontally, the aircraft also having a wing structure that has a leading edge remaining presented in the direction of flight, said power plant displacing gases in a stream directed relatively rearwardly of the power plant, and including flight control surfaces in the path of said stream, said wing structure including two generally oppositely directed and protruding wings that remain stationary relative to the body, each wing having an inner section projecting in the path of said stream and an outer section projecting out of the path of said stream, the outer sections spaced apart by a length greater than the body width proximate the wings,
   b) providing load pick-up, carry and lowering means including a line connected to the aircraft proximate the aircraft center of gravity and elongated below said body to elevate the load from the source location while the aircraft is in hover mode of flight; to transport the elevated air-borne load generally horizontally; and to lower the load at the destination location while the aircraft is air-borne hover mode, and while weight exerted by the load is imposed proximate the center of gravity of the aircraft,
   c) said body and power plant configured for vertical flight mode to elevate and set down the load, at said source and destination locations, and for generally horizontal flight mode to transport the elevated load generally horizontally below the level of the aircraft body, the bulk of the lift transmitted to the aircraft and load being supplied by the wing structure in horizontal flight mode, at cruise speed, and all loading exerted by said load is transmitted to the body proximate the aircraft center of gravity during both vertical and horizontal flight of the aircraft, the body elongated vertically during vertical flight, and elongated horizontally during horizontal flight, said line extending alongside the body along the body length during vertical flight, and the line extending below a mid-portion of the body during horizontal flight,
   d) and operating said aircraft to fly generally vertically and horizontally to pick up and suspend a load using said pick-up means, to travel in a defined corridor thereby to transport the load, and to lower the load at a destination below the aircraft.

16. The method of claim 15 including operating the aircraft to move substantially vertically during said elevation and lowering of the load, with said leading edge remaining presented generally upwardly.

17. The method of claim 15 including providing said wing structure and body to have generally rectangular outline, and providing said power plant to comprise at least one propeller located forwardly of said rectangular outline.

18. The method of claim 17 wherein said at least one propeller is provided to include one of the following:

i) two propellers rotating counterclockwise, and having laterally spaced apart axes of rotation which extend forwardly, ii) two propellers rotating counterclockwise and having a common axis of rotation which extends forwardly, and providing said aircraft to have controllably movable flight control surfaces carried at locations rearwardly of said at least one propeller and in the path of air displaced rearwardly by said at least one propeller.

19. The method of claim 18 wherein said wing structure is provided to include:

i) a single wing ii) upper and lower wings which are interconnected.

20. The method of claim 18 including providing said aircraft body to have a landing support at the aft end of the body to support the body extending upwardly from a deck or landing surface engaged by the support.

21. The method of claim 15 wherein said load is provided in the form of a camera for observation of objects below the level of the aircraft while the aircraft is operated in hovering flight mode.

22. The method of claim 21 wherein said camera is a video camera having a signal output and including providing a transmission line extending upwardly from the video camera toward the aircraft for transmitting said signal output upwardly for retrieval by equipment carried by the aircraft, said line associated with said elongated pick-up, carry and lowering means.

23. The method of claim 22 including providing a signal transmitter associated with the aircraft for transmitting high frequency signals to a remote location, and corresponding to said video camera signal output.

24. The method of claim 23 including remotely controlling the flight of the aircraft including hovering thereof, in response to changes in said video camera signal output.

* * * * *